United States Patent
Rose

(10) Patent No.: US 6,909,785 B1
(45) Date of Patent: Jun. 21, 2005

(54) METHOD AND APPARATUS FOR EFFICIENT IRREGULAR SYNCHRONIZATION OF A STREAM CIPHER

(75) Inventor: Gregory G. Rose, Mortlake (AU)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/438,342

(22) Filed: Nov. 11, 1999

(51) Int. Cl.$^7$ .............................................. H04L 9/18
(52) U.S. Cl. ........................ 380/260; 380/37; 380/42; 380/274
(58) Field of Search .................... 380/260, 28, 274, 380/37, 42, 46

(56) References Cited

U.S. PATENT DOCUMENTS

| | | | |
|---|---|---|---|
| 4,893,339 A | * 1/1990 | Bright et al. | ................. 380/28 |
| 5,060,265 A | * 10/1991 | Finkelstein | .................. 380/46 |
| 5,081,679 A | 1/1992 | Dent | |
| 5,243,653 A | 9/1993 | Malek et al. | |
| 5,546,464 A | * 8/1996 | Raith et al. | ................. 380/272 |
| 6,587,562 B1 | * 7/2003 | Jansen et al. | ............... 380/262 |

FOREIGN PATENT DOCUMENTS

| | | |
|---|---|---|
| EP | 0397384 A1 | 11/1990 |
| GB | 1499974 | 2/1978 |

OTHER PUBLICATIONS

The ATM Forum, technical comitte; ATM Security Specification Version 1.0; AF–SEC–0100.001; Feb., 1999.*

Kencheng Zeng, "Pseudorandom Bit Generators in Stream–Cipher Cryptography," Computer, IEEE Computer Society, Long Beach, CA, US, vol. 24, No. 2, Feb. 1, 1991 (pp. 8–17).

* cited by examiner

*Primary Examiner*—Justin T. Darrow
(74) *Attorney, Agent, or Firm*—Phil Wadsworth; Sandip (Micky) S. Minha; Jae-Hee Choi

(57) ABSTRACT

A method and apparatus for efficiently synchronizing a stream cipher. State information is transmitted that will allow the intended recipient of the encrypted data stream to set a stream cipher generator to the correct state from which to start generating the stream cipher. A cycle number indicating the current state of a linear feedback shift register and a stutter number indicating whether an output of the linear feedback shift register is dropped are both transmitted to a remote station along with the encrypted data stream.

13 Claims, 3 Drawing Sheets

METHOD AND APPARATUS FOR EFFICIENT IRREGULAR SYNCHRONIZATION OF A STREAM CIPHER

BACKGROUND OF THE INVENTION

I. Field of the Invention

The present invention relates to encryption. More particularly, the present invention relates to a method and apparatus for synchronizing encryption stream ciphers.

II. Background

Encryption is a process whereby a random process manipulates data such that the data is made unintelligible by all but the intended recipient. One method of encryption for digitized data is through the use of stream ciphers, which are generated by secret keys. A widely used secret key system is the Data Encryption Standard (DES) which employs a 56 bit key and 8 non-key parity bits. DES was published as a U.S. Federal Information Processing Standard in 1977. In an encryption scheme using a stream cipher, data and a stream of pseudo-random bits (or encryption bit stream) are combined, usually with the exclusive-or (XOR) operation. Many of the techniques used for generating the stream of pseudo-random numbers are based on linear feedback shift registers over a Galois finite field. The register is updated by shifting a new bit into the register, shifting the other bits over by one bit position, and calculating a new output bit. Decryption is simply the process of generating the same encryption bit stream and removing the encryption bit stream with the corresponding operation from the encrypted data. If the XOR operation was performed at the encryption side, the same XOR operation is also performed at the decryption side. For a secured encryption, the encryption bit stream must be computationally difficult to predict.

An exemplary application that utilizes stream ciphers is wireless telephony. An exemplary wireless telephony communication system is a code division multiple access (CDMA) system. The operation of a CDMA system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, and incorporated by reference herein. The CDMA system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," assigned to the assignee of the present invention, and incorporated by reference herein. Another CDMA system includes the GLOBALSTAR communication system for world wide communication utilizing low earth orbiting satellites. Other wireless telephony systems include time division multiple access (TDMA) systems and frequency division multiple access (FDMA) systems. The CDMA systems can be designed to conform to the "TIA/EIA/IS-95 Mobile Station-Base Station Compatibility Standard for Dual-Mode Wideband Spread Spectrum Cellular System," hereinafter referred to as the IS-95 standard. Similarly, the TDMA systems can be designed to conform to the TIA/EIA/IS-54 (TDMA) standard or to the European Global System for Mobile Communication (GSM) standard.

Encryption of digitized voice data in wireless telephony has been hampered by the lack of computational power in the remote station. This has led to weak encryption processes such as the Voice Privacy Mask used in the TDMA standard or to hardware generated stream ciphers such as the A5 cipher used in the GSM standard. The disadvantages of hardware-based stream ciphers are the additional manufacturing cost of the hardware and the longer time and larger cost involved in the event the encryption process needs to be changed. Since many remote stations in wireless telephony systems and digital telephones comprise a microprocessor and memory, a stream cipher that is fast and uses little memory is well suited for these applications.

There is a problem of how to generate a specific segment of the stream cipher efficiently without having to generate all of the stream cipher preceding that specific segment. This problem arises due to the required synchronization of the stream cipher at the transmission end and the receiving end of the encrypted data stream. This problem can arise in numerous circumstances. In one circumstance, a mobile station that is "roaming" from the coverage of one base station to a second base station can face difficulties when transmitting an encrypted data stream. The second base station has to regenerate the stream cipher to the current state at which the mobile station is transmitting the encrypted data stream in order for the second base station to continue the decrypt the encrypted data stream. Regenerating the entire stream cipher can be computationally time consuming, which can interfere with the voice quality of the live communication.

In another circumstance, a single stream of encrypted data may be intended for multiple receivers, such as multiple computers on a single network. It would be desirable that the receivers be able to decrypt only those portions of the encrypted data stream for which they are the intended recipients.

Other circumstances arise where it is desirable to avoid the use of system resources on the regeneration of a stream cipher from an initial state to a current state.

SUMMARY

The present invention is directed to a method and apparatus for efficient irregular synchronization of a stream cipher. Many stream ciphers use linear feedback shift registers in their design. If the starting states are known and the number of load cycles since initial loading is also known, the registers of an intended recipient can be efficiently updated to the current state of a generated stream cipher. In one aspect of the present invention, state information about the correct state from which to start generating the stream cipher is transmitted from a transmission source to an intended recipient. The state information will allow the intended recipient of the encrypted data stream to synchronize a stream cipher generator advantageously.

In one aspect of the invention, a method for synchronizing a stream cipher comprises the steps of transmitting a control set of numbers indicating the current state of the stream cipher and then using the control set of numbers to resume generation of a stream cipher.

In another aspect of the invention, a control set of numbers comprises a cycle number and a stutter number wherein the cycle number and the stutter number are used to determine a current state of the stream cipher.

DETAILED DESCRIPTION OF THE PREFERRED EMBODIMENTS

Figure 1:
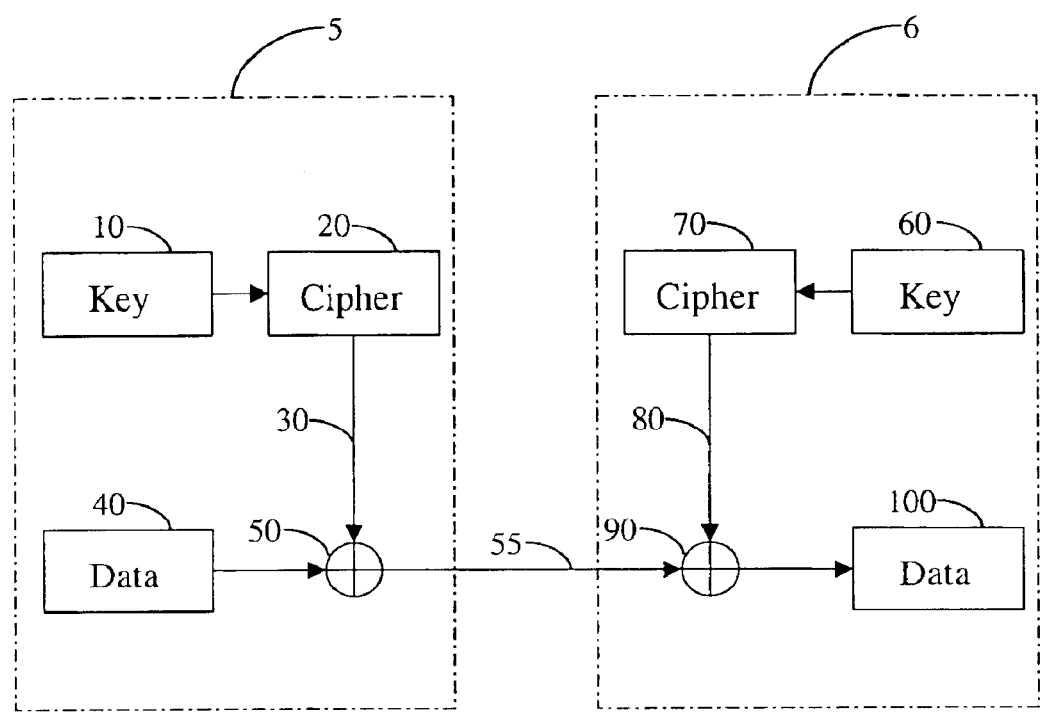
FIG. 1 is a block diagram of a conventional stream cipher encrypting a data stream and then decrypting a data stream.

FIG. 1 diagrams a process of encrypting a data stream 40 at a transmission end 5 and decrypting the encrypted data stream 55 at a receiving end 6. At the transmission end 5, a secret key 10 is used to generate a cipher 20 that generates a stream cipher 30. The stream cipher 30 is combined with the data stream 40 through a XOR operation 50. The output of the XOR operation 50 is encrypted data 55 ready for transmission to the receiving end 6. A secret key 60 at the receiving end 6, which is the same as secret key 10 at the transmission end 5, is used to generate a cipher 70. The cipher 70 generates a stream cipher 80. The stream cipher 80 is combined with encrypted data 55 through a XOR operation 90 to produce decrypted data 100.

As understood by those of skill in the art, the XOR operation is used in this description of the embodiment because the XOR operation is a self-inverse operation. However, it should be noted that any invertable operation can be used in this process, such as an addition operation on the transmission end 5 combined with a subtraction operation on the receiving end 6.

For the encryption and decryption process of FIG. 1 to work, there must be synchronization between the transmission end 5 and the receiving end 6. Each bit of the encrypted data stream must be XORed with the correct, corresponding bit of the stream cipher. Otherwise, the output will be a heavily corrupted version of the original data.

In some circumstances, restarting or regenerating the stream cipher at the receiving end 6 requires an avoidable use of system resources. One method of generating stream ciphers efficiently is disclosed in U.S. patent application Ser. No. 08/934,582, filed Sep. 22, 1997, entitled "METHOD AND APPARATUS FOR GENERATING ENCRYPTION STREAM CIPHERS," assigned to the assignee of the present invention, and incorporated by reference herein.

In one embodiment of the invention, a stream cipher can be generated with a linear feedback shift register. A linear feedback shift register holds a current state that consists of k elements from some finite field. If the starting states (derived directly from the shared secret key) are known and the number of times the linear feedback shift registers have been cycled is also known, then the registers can be updated to the state to which the encrypted data stream currently corresponds.

When a register is cycled, a new element of the register is calculated as a linear function of the existing elements according to a recurrence relation:

$$S_{n+k} = C_{k-1}S_{n+k-1} + C_{k-2}S_{n+k-2} + \ldots + C_1 S_{n+1} + C_0 S_n, \quad (1)$$

where $S_{n+k}$ is the output element, $C_i$ are coefficients, k is the order of the recurrence relation, and n is an index in time. The state variables S and coefficients $C_i$ are elements of the underlying finite field. After the new element is calculated in accordance with equation 1, the register is "shifted" by dropping the element $S_n$ and inserting $S_{n+k}$ at the other end.

Figure 2:
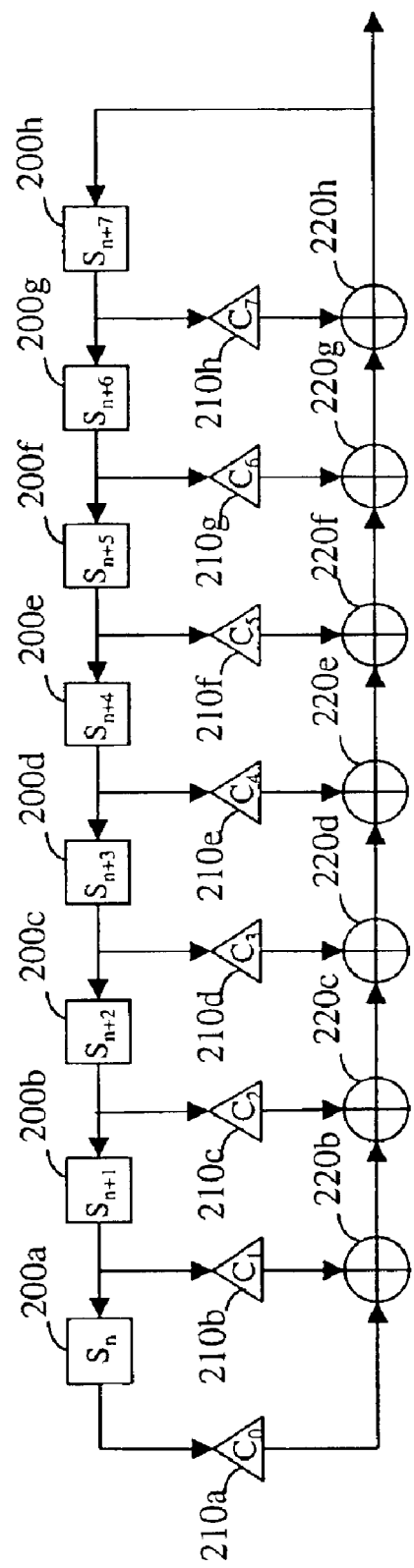
FIG. 2 is a block diagram of a stream cipher generator.

In one embodiment, the recurrence relation of equation (1) is implemented as shown in FIG. 2. The recurrence relation for a Galois field having 256 elements ($2^8$) is described for illustrative purposes, but different finite fields can also be used. For a recurrence relation of order 256, registers 200a, 200b, 200c, 200d, 200e, 200f, 200g, 200h comprise eight (8) elements $S_n$ to $S_{n+7}$. The elements $S_n$ to $S_{n+7}$ are provided to multipliers 210a, 210b, 210c, 210d, 210e, 210f, 210g, 200h that multiply the elements $S_n$ to $S_{n+7}$ with the constants $C_j$, where $0 \leq j \leq 7$. The resultant products from multipliers 210a, 210b, 210c, 210d, 210e, 210f, 210g, 200h are provided to adders 220a, 220b, 220c, 220d, 220e, 220f, 220g, 220h that sum the products to provide the output element.

Equation (1) can also be expressed as a state vector that can be described in matrix notation as:

$$s_{n+1} = A s_n, \quad (2)$$

where vectors $s_n$ and $s_{n-1}$ are k-element vectors and A is a k by k transition matrix defined by:

$$\begin{bmatrix} S_{n+1} \\ S_{n+2} \\ S_{n+3} \\ \ldots \\ S_{n+k} \end{bmatrix} = \begin{bmatrix} 0 & 1 & 0 & \ldots & 0 \\ 0 & 0 & 1 & \ldots & 0 \\ \ldots & \ldots & \ldots & \ldots & \ldots \\ 0 & 0 & 0 & \ldots & 1 \\ c_0 & c_1 & c_2 & \ldots & c_{k-1} \end{bmatrix} \begin{bmatrix} S_n \\ S_{n+1} \\ S_{n+2} \\ \ldots \\ S_{n+k-1} \end{bmatrix}.$$

Due to the iterative nature of this matrix relationship, it is possible to calculate the contents of the linear feedback shift register at any particular offset n from an initial state $s_0$ by calculating $s_n$ according to:

$$s_n = A^n s_0. \quad (3)$$

In this manner, simple matrix multiplication and exponentiation can derive the current state. It should be noted that there are numerous mathematical methods for efficiently manipulating large matrices, such as the square-and-multiply method for matrix exponentiation calculations. In order to avoid obscuring the description of the present invention, such methods will not be illustrated In another embodiment, $A^n$ can be calculated by the processor upon receipt of n. In either case, the embodiments enable transmission of cycle numbers that will inform the intended recipient of the current state of the stream cipher corresponding to the encrypted data stream at the time the intended recipient receives the encrypted data stream.

Figure 3:
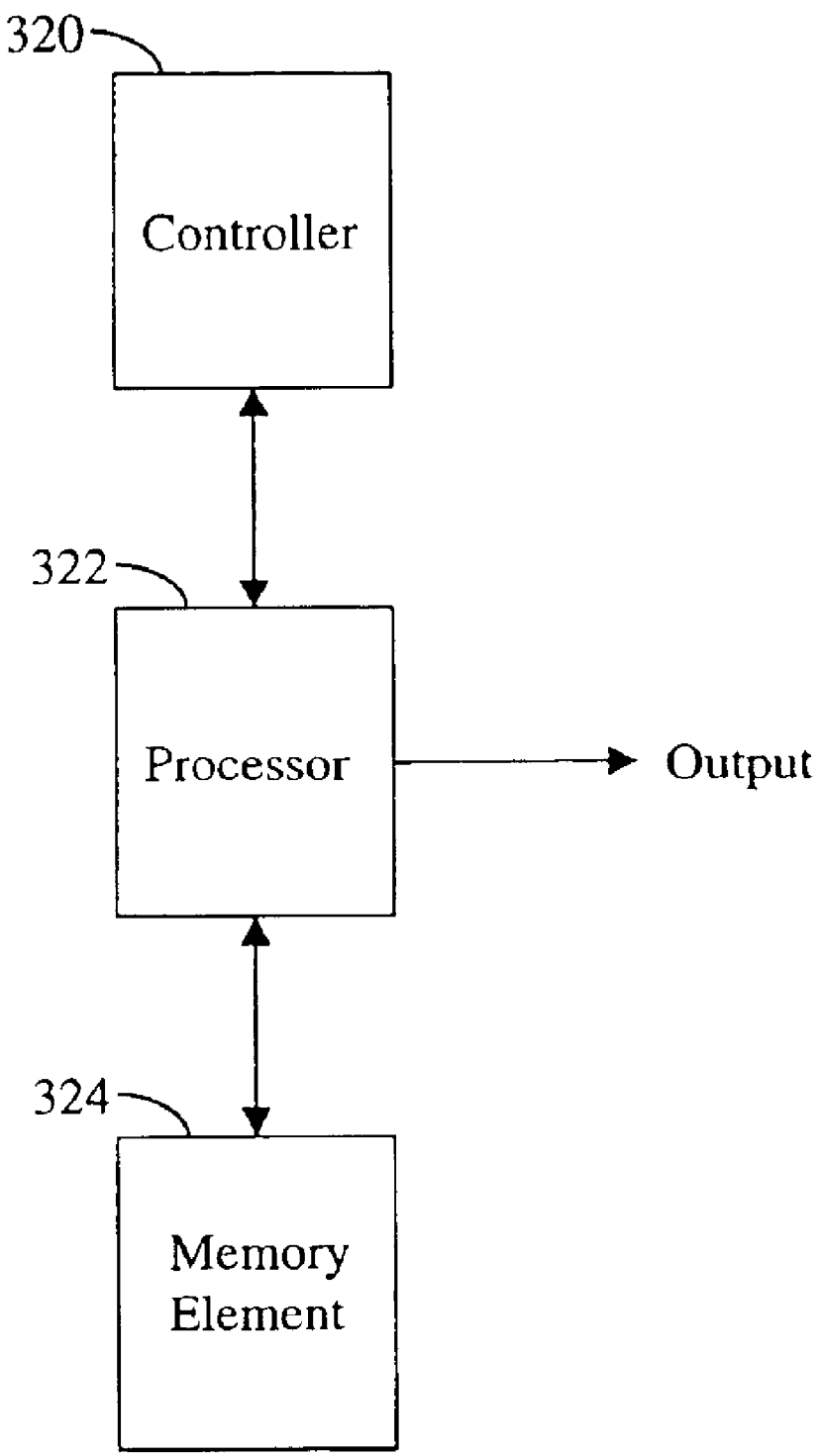
FIG. 3 is a block diagram of a stream cipher generator using a processor.

A block diagram of a stream cipher generator utilizing a processor is shown in FIG. 3. Controller 320 connects to processor 322 and comprises the set of instructions that directs the operation of processor 322. Controller 320 can comprise a software program or a set of microcodes. Processor 322 is the hardware that performs the manipulation required by the generator. Processor 322 can be implemented as a microcontroller, a microprocessor, or a digital signal processor designed to performed the functions described herein. Memory element 324 connects to processor 322 and is used to implement the linear feedback shift register and to store pre-computed tables and instructions. Memory element 324 can be implemented with random-access-memory or other memory devices designed to perform the functions described herein. The instructions and tables can be stored in read-only memory. Only the memory for the register itself needs to be modified during the execution of the algorithm.

In another embodiment of the invention, a process called stuttering can be utilized to inject non-linearity into the encrypted data stream. This will disallow an unintended recipient from generating the stream cipher by simply copying the state information and running the stream cipher generator.

A non-linear output derived from the state of the linear feedback shift register may be used to reconstruct the state of a shift register through stuttering. This reconstruction can be made more difficult by not representing some of the states at the output of the generator, and choosing which in an unpredictable manner. In one embodiment, the non-linear output is used to determine what subsequent bytes of non-linear output appear in the output stream. When the generator is started, the first output byte is used as the stutter control byte. Each stutter control byte is divided into four pairs of bits, with the least significant pair being used first. When all four pairs have been used, the next non-linear output byte from the generator is used as the next stutter control byte, and so on.

Each pair of stutter control bits can take on one of four values. In one embodiment, the action performed for each pair value is tabulated in Table 1.

TABLE 1

| Pair Value | Action of Generator |
| --- | --- |
| (0, 0) | Register is cycled but no output is produced |
| (0, 1) | Register is cycled and the non-linear output XORed with a constant becomes the output of the generator. Register is cycled again. |
| (1, 0) | Register is cycled twice and the non-linear output becomes the output of the generator. |
| (1, 1) | Register is cycled and the non-linear output XORed with a constant becomes the output of the generator. |

As shown in Table 1, in the exemplary embodiment, when the pair value is (0, 0), the register is cycled once but no output is produced. Cycling of the register denotes the calculation of the next sequence output and then shifting this new element into the register. The next stutter control pair is then used to determine the action to be taken next.

In one embodiment, when the pair value is (0, 1), the register is cycled and the non-linear output is generated. The non-linear output is XORed with a constant and the result is provided as the generator output. The register is then cycled again. When the pair value is (1, 0) the register is cycled twice and the generated non-linear output is provided as the generator output. When the pair value is (1, 1) the register is cycled and the non-linear output becomes generated. The non-linear output is then XORed with a constant and the result is provided as the generator output.

The constants that are used in the above steps are advantageously selected such that when a generator output is produced, half of the bits in the output are inverted with respect to the outputs produced by the other stutter control pairs. For stutter control pair (1, 0), the non-linear output can be viewed as being XORed with the constant (0 0 0 0 0 0 0 0). Thus, the Hamming distance between any of the three constants is four. The bit inversion further masks the linearity of the generator and frustrates any attempt to reconstruct the state based on the generator output.

For some stream ciphers, the encrypted data stream corresponds exactly to some number of cycles of the linear feedback shift registers. Hence, the cycle number can be used directly to update the state of the register. In one embodiment of the invention, both the transmission source and the intended recipient can start generating a stream cipher from any arbitrary point.

For other stream ciphers requiring more security, a process such as stuttering is inserted into the generation of the stream cipher to add non-linearity to the stream cipher. In one embodiment, the number of register cycles is counted and the number of stutter control variables is counted during the execution of the algorithm to generate a synchronized stream cipher. It should be noted that synchronization can occur at any point during the transmission of the encrypted data stream. Whenever the intended recipient is to be synchronized with the transmission source, two numbers can be transmitted to the intended recipient. The first number would indicate the number of register cycles required after initialization to reach the most recent stutter control setting and the second number would indicate the number of stutter control operations to be performed before the transmission source and the intended recipient are again synchronized.

The above embodiments are described for the exemplary Galois finite field of order 256 ($2^8$). However, different finite fields can also be used such that the size of the elements matches the byte or word size of the processor used to manipulate the elements and/or the memory used to implement the shift register, or having other advantages. Thus, various finite fields having more than two elements can be utilized and are within the scope of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for synchronizing a stream cipher, comprising:

transmitting at least a cycle number indicating a current state of the stream cipher at a transmission source;

at a reception site, using a first array of numbers and the cycle number to determine a second array of numbers; and using the second array of numbers and a first set of numbers to determine the current state of the stream cipher.

2. The method of claim 1, wherein the second array of numbers is determined by performing a series of multiplication operation of the first array of numbers with itself, wherein the number of multiplication operations is determined by the cycle number.

3. The method of claim 1, wherein the second array of numbers is pre-calculated and is stored by the first recipient before the step of transmitting the control set of numbers.

4. The method of claim 1, wherein transmitting at least the cycle number comprises:

transmitting an encrypted data stream from a first source to a plurality of recipients, wherein the encrypted data stream is encrypted using the stream cipher;

transmitting a plurality of cycle numbers from the first source to the plurality of recipients; and determining the current state of the stream cipher by using the plurality of cycle numbers by each of the plurality of recipients, wherein each of the plurality of recipients uses one of the plurality of cycle numbers.

5. The method of claim 4 wherein each of the plurality of recipients determines a different current state of the stream cipher.

6. The method of claim 4 wherein the step of determining the current state of the stream cipher is accomplished by the formula:

$$s_{n+k} = c_{k-1} s_{n+k-1} + k_{k-2} s_{n+k-2} + \ldots + c_1 s_{n+1} + c_0 s_n$$

wherein k is the size of a linear shift register, n is the cycle number, $s_i$ is an element stored in a linear shift register with $n \leq i \leq n+k-1$, and $c_j$ is a constant with $0 \leq j \leq k-1$.

7. The method of claim 1 wherein the second array of numbers is determined by performing a series of multiplication operations of the first array of numbers with itself, wherein the number of multiplication operations is determined by the cycle number.

8. The method of claim 1, wherein the second array of numbers is pre-calculated and is stored by the first recipient before the step of transmitting the control set of numbers.

9. The method of claim 1, further comprising transmitting a stutter number indicative of the current state of the stream cipher at the transmission source.

10. The method of claim 9, wherein transmitting the stutter number comprises transmitting from a mobile station to a base station.

11. The method of claim 9 wherein determining the current state of the stream cipher is accomplished by the formula:

$$s_{n+k} = c_{k-1}s_{n+k-1} + c_{k-2}s_{n+k-2} + \ldots + c_1 s_{n+1} + s_0 s_n$$

wherein k is the size of a linear shift register, n is the cycle number, $s_i$ is an element stored in a linear shift register with $n \leq i \leq n+k-1$, and $c_j$ is a constant with $0 \leq j \leq k-1$.

12. A method for synchronizing a first stream cipher generated at a transmission source and a second stream cipher generated at a reception site, wherein the first stream cipher and the second stream cipher are generated by a common recurrence relation, the method comprising:

determining an offset of a current state of the first stream cipher from an initial state;

determining types of stutter control variables associated with the current state of the first stream cipher and the number of instances each of the stutter control variable types were used to generate the current state of the first stream cipher; and transmitting the number of instances each of the stutter control variables types were used to generate the current state of the first stream cipher and the offset of the current state of the first stream cipher to the reception site, whereupon the reception site also uses number of instances and the offset to calculate a new current state of the second stream cipher.

13. An apparatus for synchronizing a first stream cipher generated at a transmission source and a second stream cipher generated at a reception site, wherein the first stream cipher and the second stream cipher are generated by a reception site, wherein the first stream cipher and the second stream cipher are generated by a common recurrence relation, comprising:

a linear feedback shift register configured to output the first stream cipher;

a processor for manipulating the contents of the linear feedback shift register and for implementing a stuttering process upon the output of the linear feedback shift register; and a controller communicatively coupled to the processor, the controller for;

determining an offset of a current state of the first stream cipher from an initial state, wherein the offset is for transmission to the reception site, whereupon the reception site uses the offset to calculate a new current state of the second stream cipher;

determining the types of stutter control variables associated with the current state of the first stream cipher; and determining the number of instances each of the stutter control variable types were used to generate the current state of the first stream cipher.

* * * * *